US011966639B2

(12) United States Patent
Yoshifuku

(10) Patent No.: US 11,966,639 B2
(45) Date of Patent: Apr. 23, 2024

(54) REMOTE MANAGEMENT SYSTEM AND MANAGEMENT IMAGE FORMING APPARATUS COMPRISING SUPERIMPOSING A SCREEN FROM A REMOTELY ACCESSED TARGET APPARATUS AT A FIRST TOUCH PANEL ON A MANAGEMENT IMAGE FORMING APPARATUS, WHEREIN AN EDGE SERVER RECEIVES, FROM A REMOTELY TARGET APPARATUS, APPARATUS LOG DATA AND SERVER LOG DATA FROM A SITE SERVER

(71) Applicant: KYOCERA DOCUMENT SOLUTIONS INC., Osaka (JP)

(72) Inventor: Yuta Yoshifuku, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/211,653

(22) Filed: Jun. 20, 2023

(65) Prior Publication Data

US 2023/0418527 A1 Dec. 28, 2023

(30) Foreign Application Priority Data

Jun. 22, 2022 (JP) ................................ 2022-100237

(51) Int. Cl.
*G06F 3/12* (2006.01)
*H04N 1/00* (2006.01)

(52) U.S. Cl.
CPC .......... *G06F 3/1203* (2013.01); *G06F 3/1238* (2013.01); *G06F 3/1273* (2013.01); *G06F 3/1288* (2013.01)

(58) Field of Classification Search
CPC .... G06F 3/1203; G06F 3/1238; G06F 3/1273; G06F 3/1288; H04N 1/00029;
(Continued)

(56) References Cited

U.S. PATENT DOCUMENTS

2011/0007351 A1* 1/2011 Kurumasa ............ H04N 1/4426
358/1.15
2012/0192077 A1* 7/2012 Castellani .......... H04N 1/00029
715/740
(Continued)

FOREIGN PATENT DOCUMENTS

JP 201874232 A 5/2018
JP 2020119302 A 8/2020

*Primary Examiner* — Chad Dickerson
(74) *Attorney, Agent, or Firm* — Li & Cai Intellectual Property (USA) Office

(57) ABSTRACT

An apparatus includes a first panel, a communication device configured to remotely access image forming apparatuses each including a second panel, and a circuitry configured to when a login from a manager is accepted, display, on the first panel, a management target selection screen for selecting a remote access target apparatus to be a remote access target, from the image forming apparatuses, when the remote access target apparatus is selected, display, on the first panel, a management menu screen including a remote operation start button for executing a remote operation of the first panel of the remote access target apparatus, and when the remote operation start button is operated, superimpose a screen, which is displayed on the second panel of the remote access target apparatus, on the management menu screen displayed on the first panel to thereby display the screen in a remotely operable manner using the first panel.

4 Claims, 13 Drawing Sheets

(58) Field of Classification Search
CPC ........... H04N 1/00002; H04N 1/00007; H04N 1/00031; H04N 1/00042
USPC .............................................. 358/1.11–1.18
See application file for complete search history.

(56) References Cited

U.S. PATENT DOCUMENTS

| | | | |
|---|---|---|---|
| 2018/0095396 A1* | 4/2018 | Sun | G06F 3/1231 |
| 2018/0096155 A1* | 4/2018 | Ryu | G06F 3/1222 |
| 2019/0362262 A1* | 11/2019 | Inagi | G06F 30/20 |
| 2020/0244828 A1 | 7/2020 | Sasaki | |
| 2022/0124215 A1* | 4/2022 | Urakawa | H04N 1/00408 |

* cited by examiner

REMOTE MANAGEMENT SYSTEM AND MANAGEMENT IMAGE FORMING APPARATUS COMPRISING SUPERIMPOSING A SCREEN FROM A REMOTELY ACCESSED TARGET APPARATUS AT A FIRST TOUCH PANEL ON A MANAGEMENT IMAGE FORMING APPARATUS, WHEREIN AN EDGE SERVER RECEIVES, FROM A REMOTELY TARGET APPARATUS, APPARATUS LOG DATA AND SERVER LOG DATA FROM A SITE SERVER

CROSS-REFERENCE TO RELATED PATENT APPLICATION

This application claims the benefit of Japanese Priority Patent Application JP 2022-100237 filed Jun. 22, 2022, the entire contents of which are incorporated herein by reference.

FIELD OF THE DISCLOSURE

The present disclosure relates to a remote management system and a management image forming apparatus that remotely manages a plurality of image forming apparatuses.

BACKGROUND OF THE DISCLOSURE

There are cases in which a manager manages information of a plurality of image forming apparatuses that are management targets, remotely operates them, and corrects bugs by using a personal computer.

It is desirable to remotely manage a plurality of image forming apparatuses more efficiently.

In view of such circumstances, it is desirable to provide a remote management system and a management image forming apparatus that remotely manages a plurality of image forming apparatuses more efficiently.

SUMMARY OF THE DISCLOSURE

According to an embodiment of the present disclosure, there is provided a remote management system, including:
a management image forming apparatus including
a first touch panel,
a communication device configured to remotely access a plurality of image forming apparatuses each including a second touch panel, and
a controller circuitry configured to
when a login from a manager is accepted, display, on the first touch panel, a management target selection screen for selecting a remote access target apparatus to be a remote access target, from the plurality of image forming apparatuses,
when the remote access target apparatus is selected, display, on the first touch panel, a management menu screen including a remote operation start button for executing a remote operation of the first touch panel of the remote access target apparatus, and
when the remote operation start button is operated, superimpose a screen, which is displayed on the second touch panel of the remote access target apparatus, on the management menu screen displayed on the first touch panel to thereby display the screen in a remotely operable manner using the first touch panel.

According to the present disclosure, it is possible to remotely manage a plurality of image forming apparatuses more efficiently.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. Remote Management System

Figure 1:
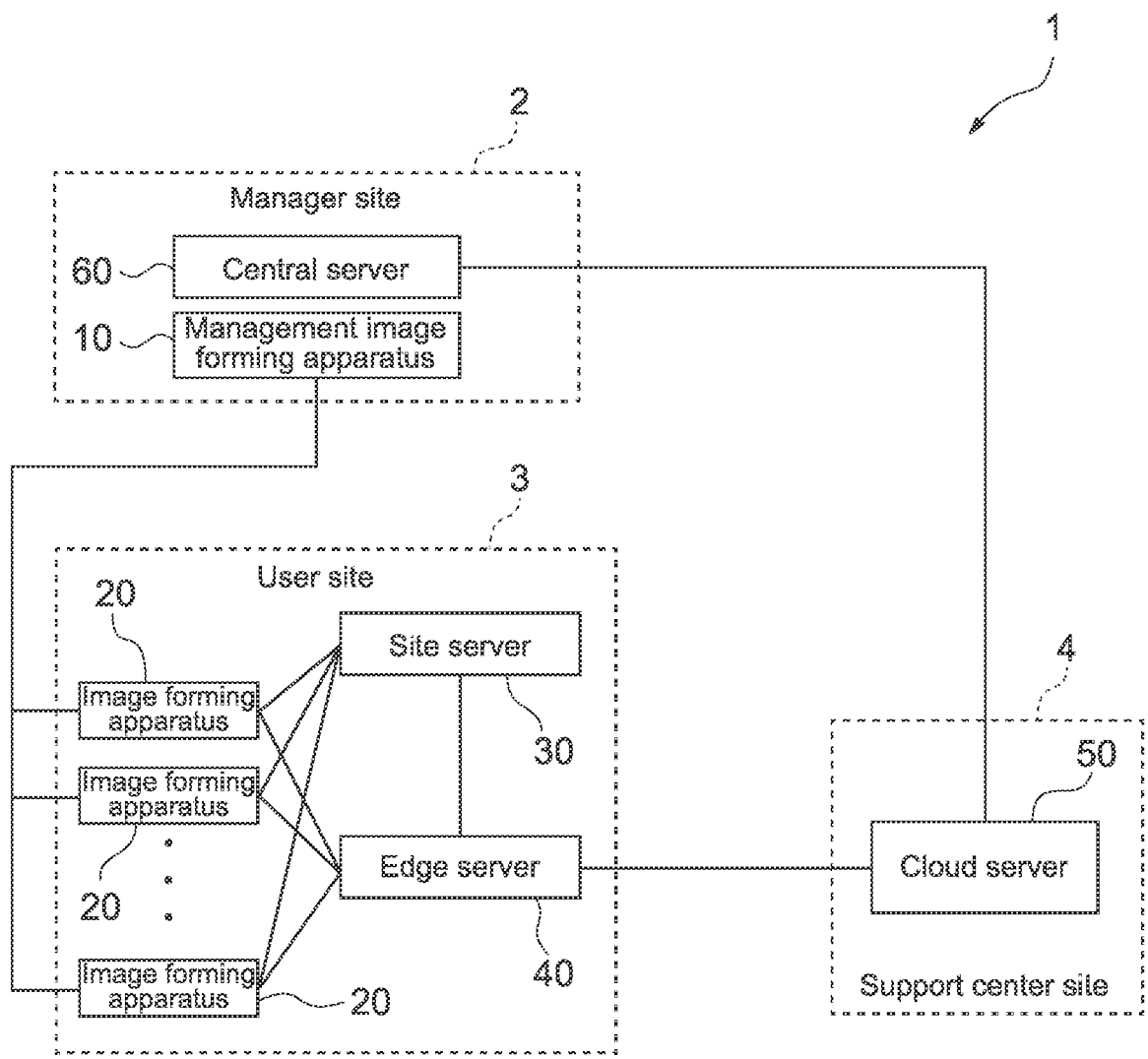
FIG. 1 shows a remote management system of an embodiment of the present disclosure.

FIG. 1 shows a remote management system of an embodiment of the present disclosure.

The remote management system 1 includes a management image forming apparatus 10, a plurality of image forming apparatuses 20, a site server 30, an edge server 40, a cloud server 50, and a central server 60. The management image forming apparatus 10 and the plurality of image forming apparatuses 20 are image forming apparatuses such as MFPs (Multifunction Peripherals). The site server 30, the edge server 40, the cloud server 50, and the central server 60 are information processing apparatuses such as personal computers.

The management image forming apparatus 10 and the central server 60 are installed in the manager site 2. The plurality of image forming apparatuses 20, the site server 30, and the edge server 40 are installed in the user site 3. The cloud server 50 is installed in the support center site 4.

"Being installed at a site" includes physical and/or virtual installation. In addition, there are a plurality of user sites 3, and each of the user sites 3 includes a plurality of image forming apparatuses 20, a site server 30, and an edge server 40. However, for convenience of explanation, a plurality of image forming apparatuses 20, a site server 30, and an edge server 40 installed in one user site 3 will be illustrated and described.

The image forming apparatuses 20, the site server 30, and the edge server 40 are connected to each other via a network such as the Internet. The cloud server 50 is connected to the edge server 40 and the central server 60. The management image forming apparatus 10 is connected to the plurality of image forming apparatuses 20 via a network such as the Internet.

Each image forming apparatus 20 is activated by the site server 30. Each image forming apparatus 20 is used by a user such as an end user. The site server 30 stores server logs received from the respective image forming apparatuses 20 and supplies the server logs to the edge server 40. The management image forming apparatus 10 is operated by a manager who remotely manages and monitors each image forming apparatus 20, and can remotely access and remotely manage and monitor each image forming apparatus 20. The manager can also access the central server 60.

2. Hardware Configuration of Image Forming Apparatus

Figure 2:
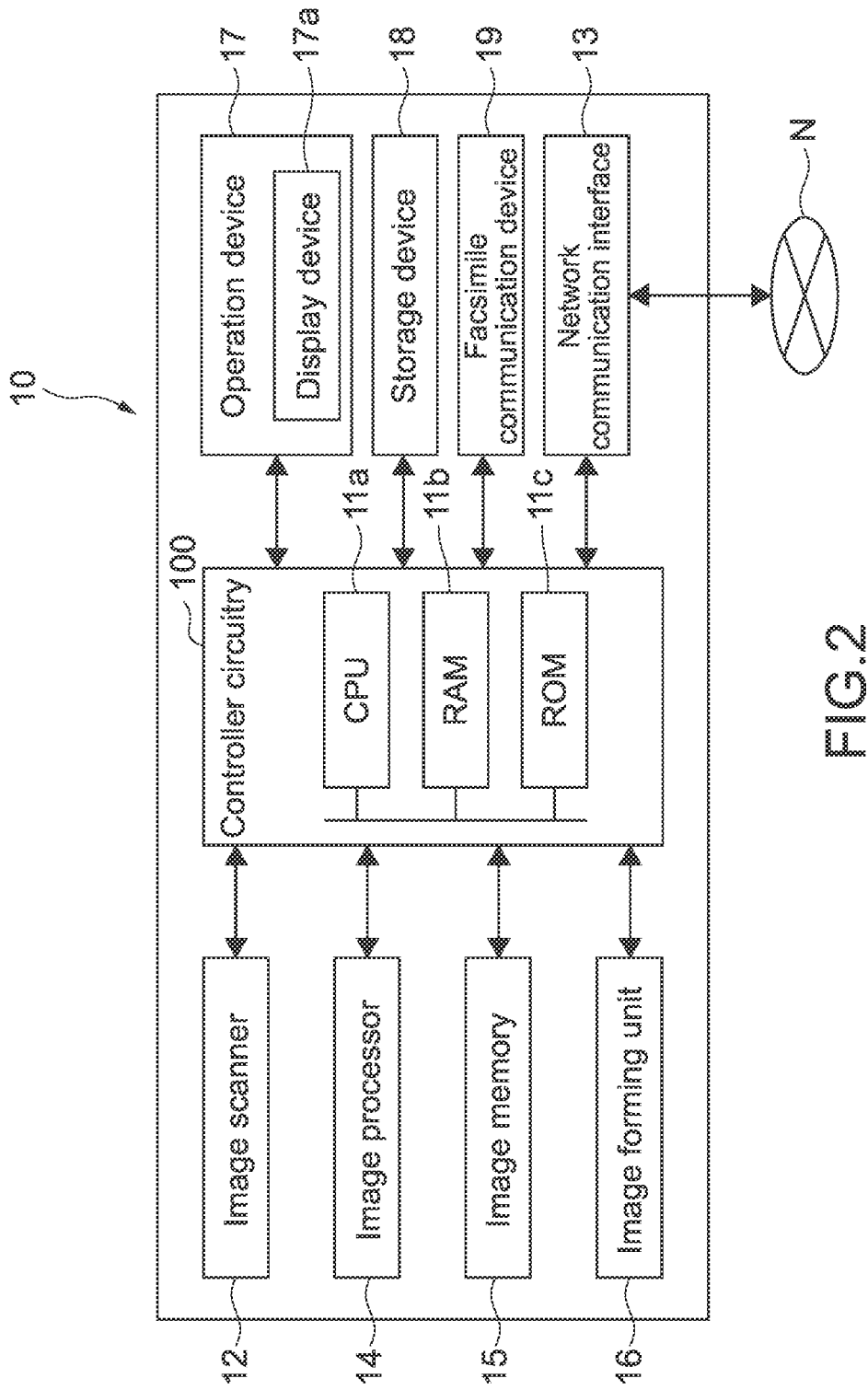
FIG. 2 shows a hardware configuration of an image forming apparatus.

FIG. 2 shows a hardware configuration of an image forming apparatus.

The hardware configuration of the management image forming apparatus 10 and the plurality of image forming apparatuses 20 is the same. The hardware configuration of the management image forming apparatus 10 will only be described and illustrated for example.

The management image forming apparatus 10 includes the controller circuitry 100. The controller circuitry 100 includes the CPU (Central Processing Unit) 11a (processor), the RAM (Random Access Memory) 11b, the ROM (Read Only Memory) 11c (memory), dedicated hardware circuitries, and the like and performs overall operational control of the management image forming apparatus 10. The CPU 11a loads information processing programs stored in the ROM 11c in the RAM 11b and executes the information processing programs. The nonvolatile ROM 11c stores information processing programs executed by the CPU 11a and data. The ROM 11c is an example of a non-transitory computer readable recording medium.

The controller circuitry 100 is connected to the image scanner 12, the image processor 14 (including GPU (Graphics Processing Unit)), the image memory 15, the image forming unit 16 (printer), the operation device 17 including the display device 17a (touch panel), the large-volume nonvolatile storage device 18 such as an HDD (Hard Disk Drive) or an SSD (Solid State Drive), the facsimile communication device 19, the network communication interface 13, and the like. The controller circuitry 100 performs operational control of the respective devices connected thereto and sends/receives signals and data to/from those devices. The operation device 17 including the display device 17a (touch panel) is an embodiment of an input device. A sound input device including a microphone may be provided as an input device.

Hereinafter, a touch panel of the management image forming apparatus 10 will be referred to as a first touch panel 17, and a touch panel of each image forming apparatus 20 will be referred to as a second touch panel 27.

3. Hardware Configuration of Server

Figure 3:
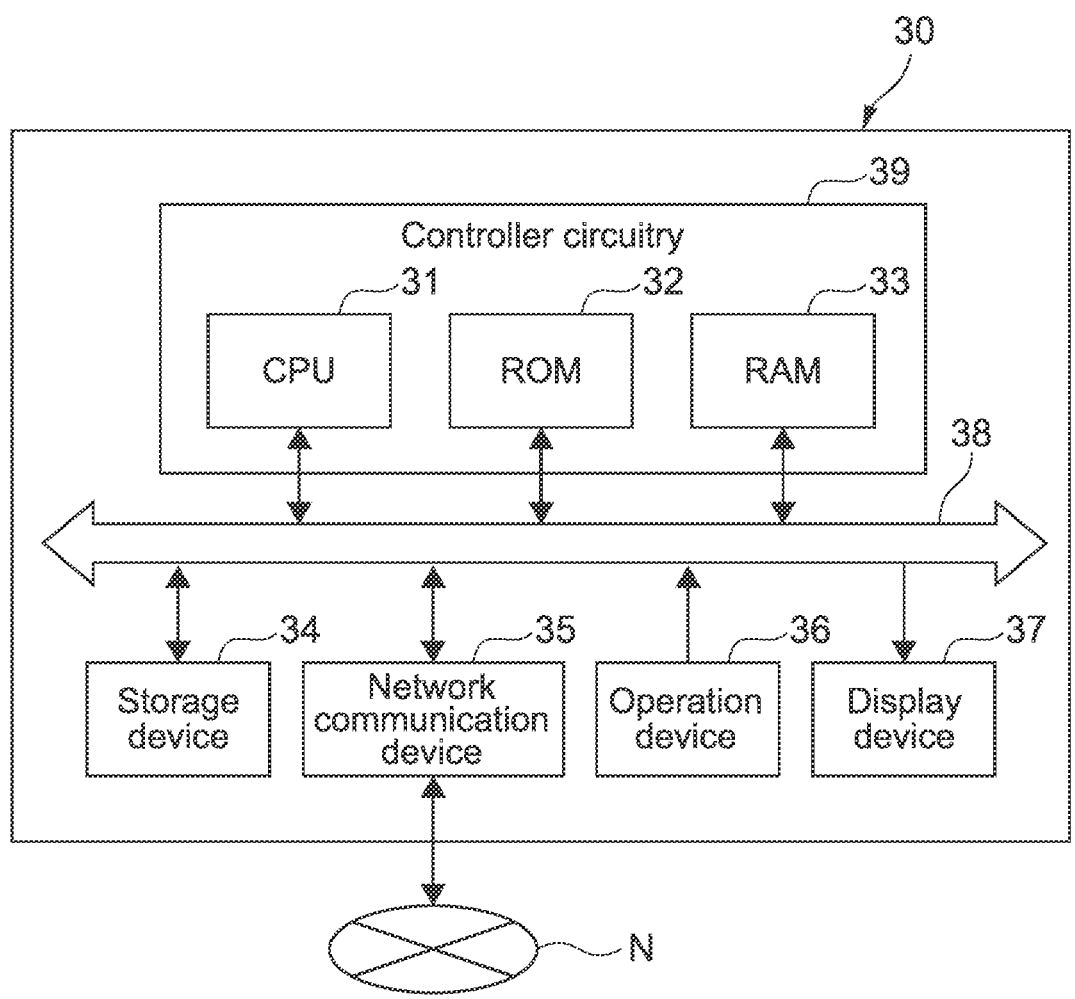
FIG. 3 shows a hardware configuration of a server.

FIG. 3 shows a hardware configuration of a server.

The hardware configuration of the site server 30, the edge server 40, the cloud server 50, and the central server 60 is the same. The hardware configuration of the site server 30 will only be described and illustrated for example.

The site server 30 includes the controller circuitry 39 including the CPU 31, the ROM 32, and the RAM 33, the storage device 34, the network communication device 35, the operation device 36, and the display device 37, and the bus 38 connecting them to each other.

The CPU 31 loads information processing programs stored in the ROM 32 in the RAM 33 and executes the information processing programs. The nonvolatile ROM 32 stores information processing programs executed by the CPU 31 and data. The ROM 32 is an example of a non-transitory computer readable recording medium.

4. Operational Flow of Remote Management System

Figure 4:
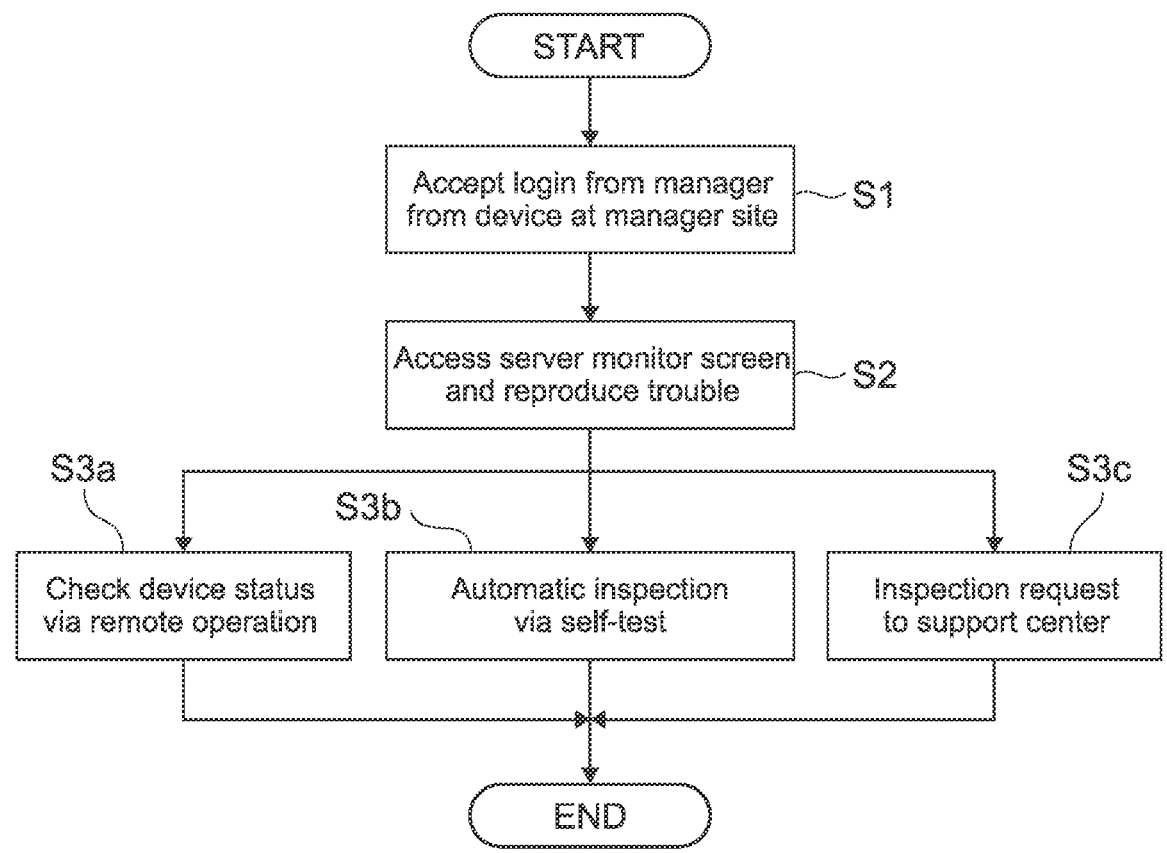
FIG. 4 shows an operational flow of the remote management system.

FIG. 4 shows an operational flow of the remote management system.

When the management image forming apparatus 10 accepts a login from a manager (i.e., an account to which manager authority has been granted), the management image forming apparatus 10 displays a management target selection screen 200 on the first touch panel 17 (Step S1).

Figure 5:
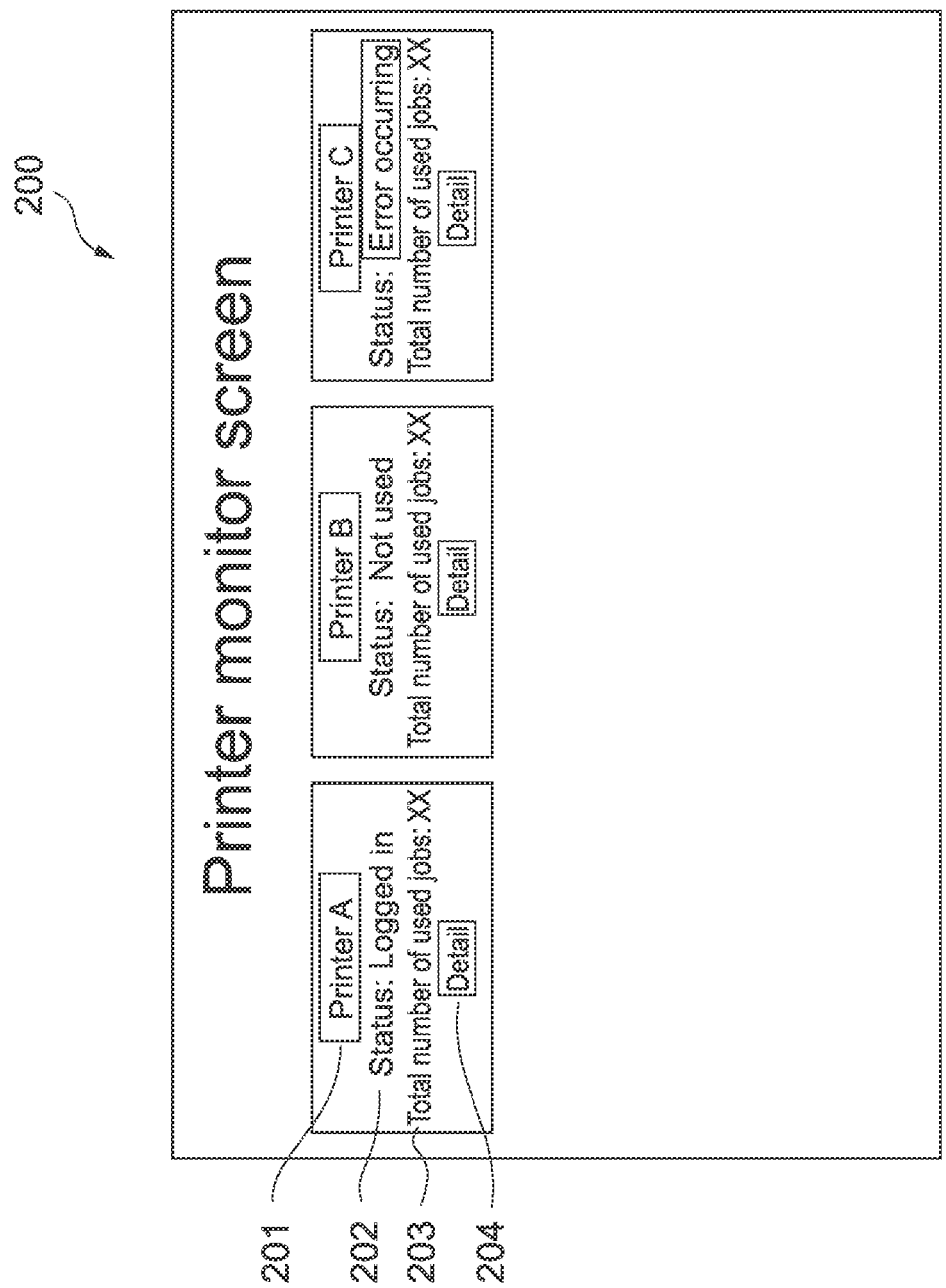
FIG. 5 shows an example of a management target selection screen.

FIG. 5 shows an example of a management target selection screen.

The management target selection screen 200 is a screen for selecting an image forming apparatus 20 (referred to as a remote access target apparatus 20C) to be a remote access target from the plurality of image forming apparatuses 20 to be remotely managed by the management image forming apparatus 10. The management target selection screen 200 displays, for each of the plurality of image forming apparatuses 20, a name 201, a status 202 (logged in, not used, error occurring, and the like), a total number of used jobs 203, and a detail button 204 that is a button for transitioning to the detail screen.

In this embodiment, the manager refers to the status 202 "error occurring" of the name 201 "Printer C" and operates the detail button 204 associated with the name 201 "Printer C" to select the image forming apparatus 20 having the name 201 "Printer C" as the remote access target apparatus 20C.

When the manager selects the remote access target apparatus 20C on the management target selection screen 200, the management image forming apparatus 10 displays the management menu screen 300 on the first touch panel 17 (Step S2).

Figure 6:
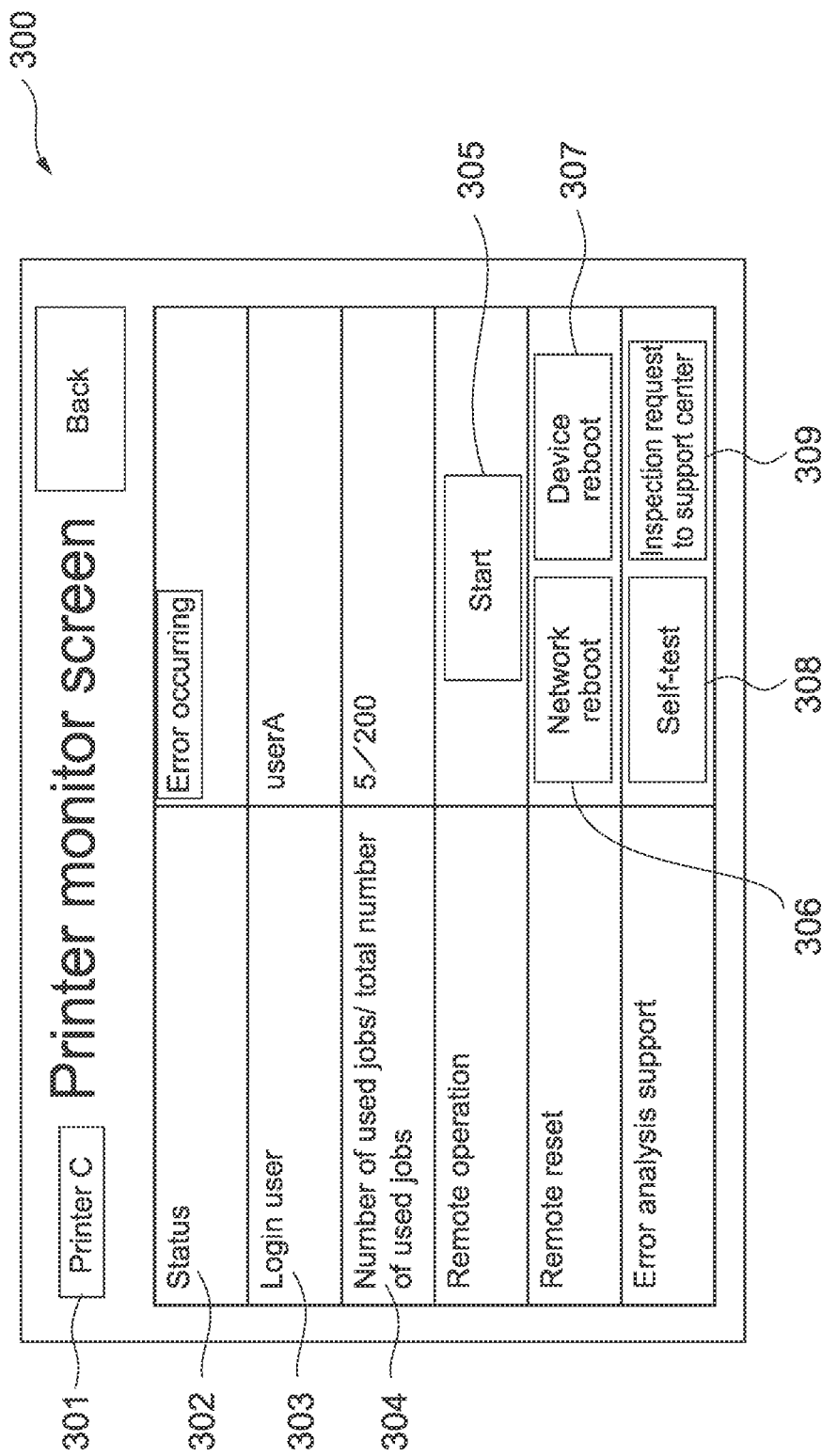
FIG. 6 shows an example of a management menu screen.

FIG. 6 shows an example of a management menu screen.

The management menu screen 300 displays the name 301 (printer C) of the remote access target apparatus 20C, the status 302 (error occurring), the login user name 303 (user A), the number of used jobs/the total number of used jobs 304 (5/200), the remote operation start button 305, the remote reset buttons 306 and 307, the self-test execution button 308, and the inspection request button 309.

The remote operation start button 305 is a button for executing a remote operation of the first touch panel 17 of the remote access target apparatus 20C. The self-test execution button 308 is a button for executing a self-test of the remote access target apparatus 20C. The inspection request button 309 is a button for requesting a support center to inspect the remote access target apparatus 20C.

On the management menu screen 300, the manager operates a remote operation start button 305, a self-test execution button 308, or an inspection request button 309. Then, the management image forming apparatus 10 remotely accesses the remote access target apparatus 20C and executes the remote operation (Step S3a), the self-test (Step S3b), or the inspection request (Step S3c). Note that the remote operation (Step S3a), the self-test (Step S3b), and the inspection request (Step S3c) are not automatically executed in order, but are executed using the button operation of the manager as a trigger.

(1) Remote Operation

When the remote operation start button 305 is operated by the manager on the management menu screen 300, the management image forming apparatus 10 starts remote operation of the remote access target apparatus 20C (Step S3a).

Figure 7:
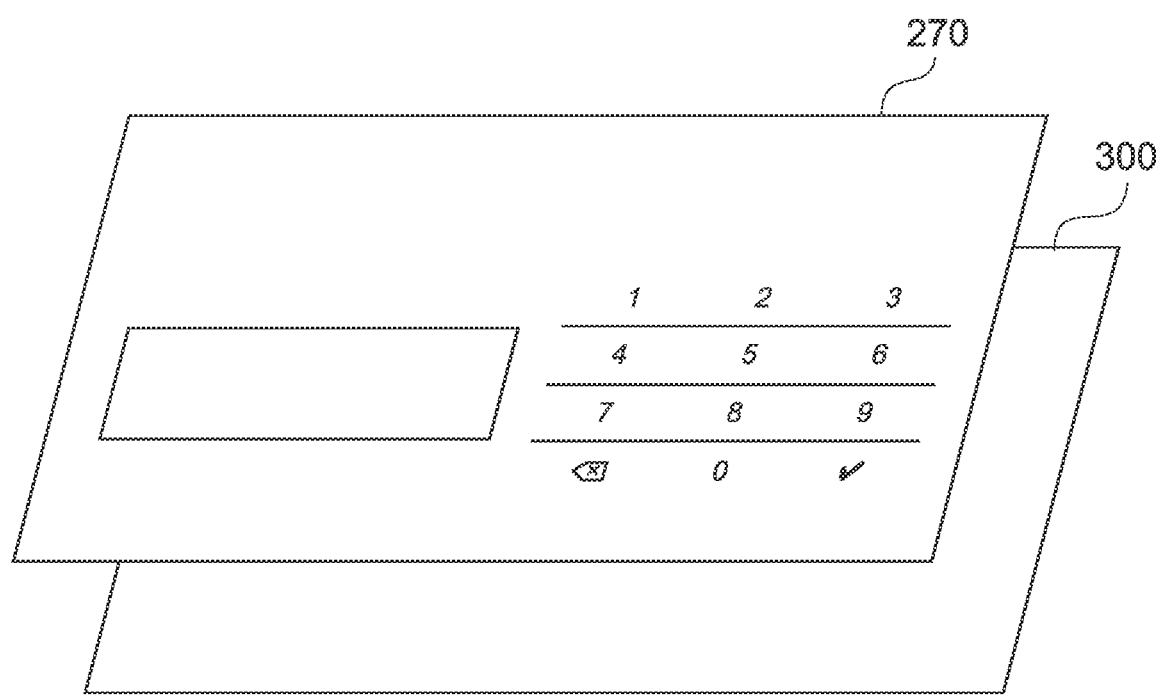
FIG. 7 schematically shows a display screen of remote operation.

FIG. 7 schematically shows a display screen of remote operation.

Specifically, the management image forming apparatus 10 superimposes the screen 270, which is displayed on the second touch panel 27 of the remote access target apparatus 20C, on the management menu screen 300 displayed on the first touch panel 17 (i.e., covers the management menu screen 300) to thereby display the screen 270 in a remotely operable manner using the first touch panel 17. Thus, the manager can remotely operate the screen 270, which is displayed on the second touch panel 27 of the remote access target apparatus 20C, by using the first touch panel 17 of the management image forming apparatus 10.

As a result, the manager can intuitively remotely operate the remote access target apparatus 20C using the same type of interface as when the remote access target apparatus 20C is remotely operated using another type of electronic apparatus (such as a personal computer) from the image forming apparatus 20.

The management image forming apparatus 10 determines the status of the remote access target apparatus 20C in the remote access after the remote operation, and displays the status 302 after the remote operation on the management menu screen 300. If the status 302 after the remote operation is not "error occurring", the manager determines that the error of the remote access target apparatus 20C has disappeared, and ends the process. On the other hand, if the status 302 after the reboot is "error occurring", the manager may operate the self-test execution button 308 or the inspection request button 309 as the next means.

(2) Self-Test

Figure 8:
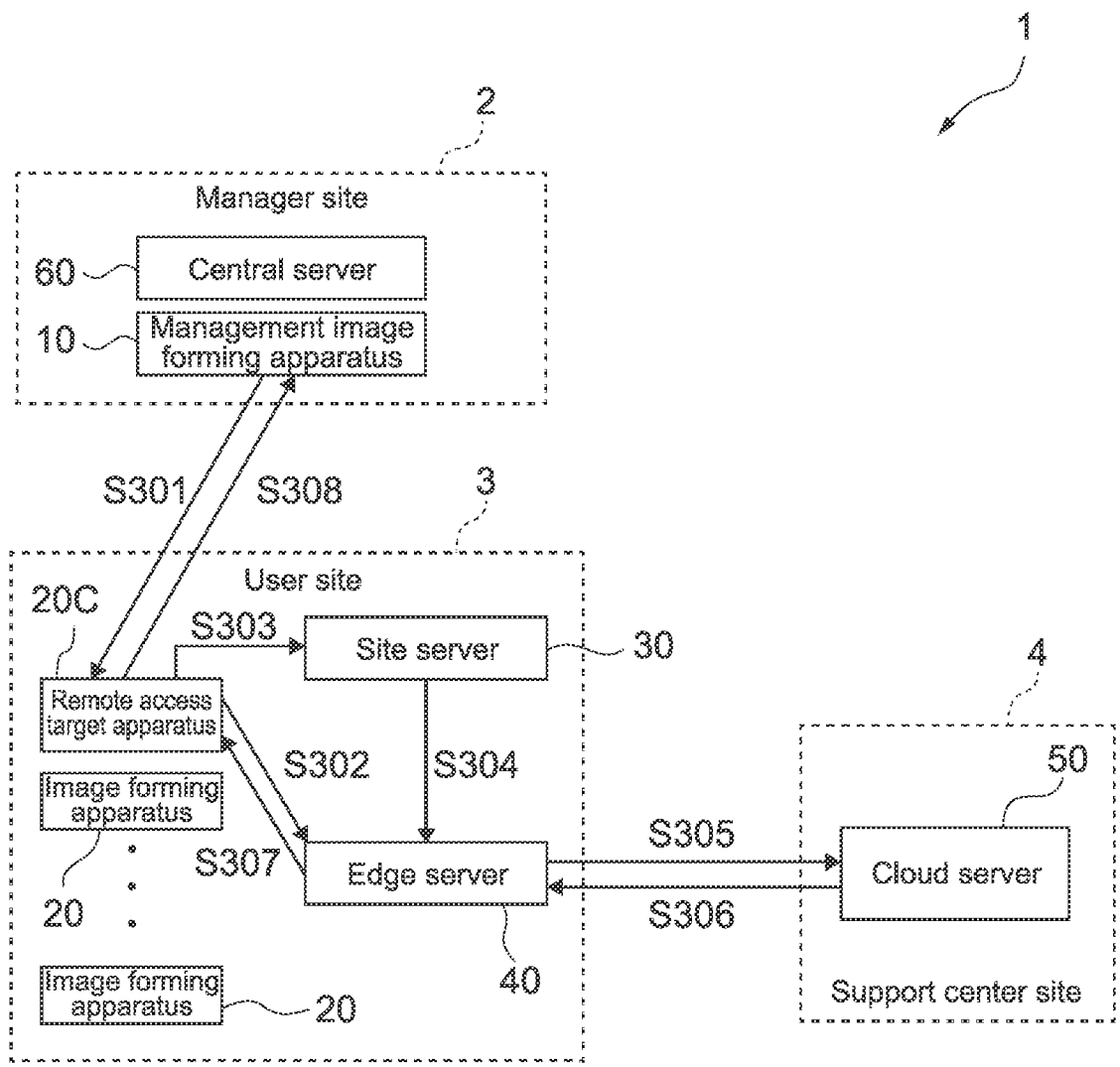
FIG. 8 shows the operation sequence of the self-test.
Figure 9:
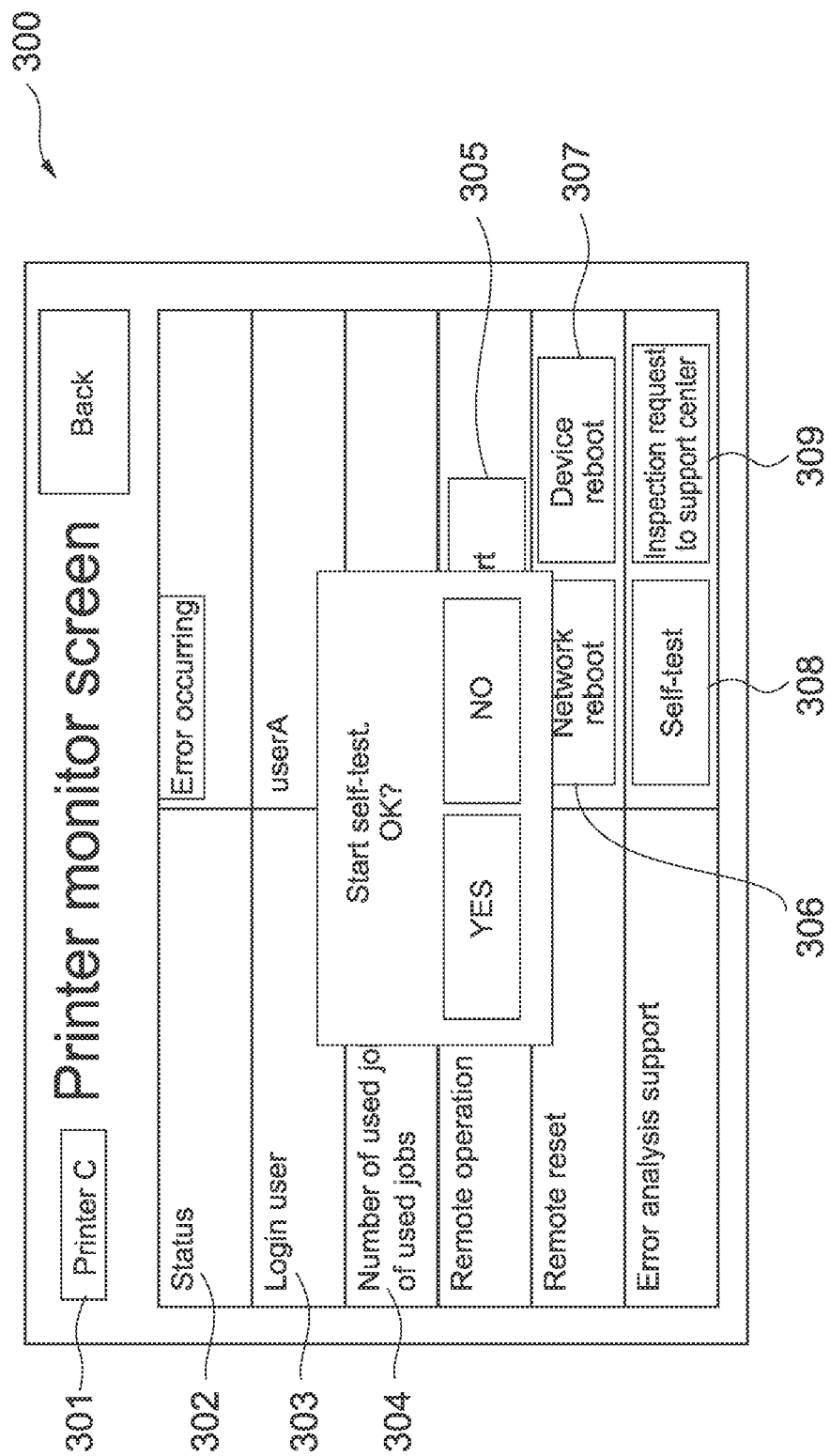
FIG. 9 shows a GUI for determining the start of self-test execution.

FIG. 8 shows the operation sequence of the self-test. FIG. 9 shows a GUI for determining the start of self-test execution.

When the manager operates the self-test execution button 308 on the management menu screen 300, the management image forming apparatus 10 starts a self-test of the remote access target apparatus 20C (Step S3b). After the self-test execution button 308 is operated, the management image forming apparatus 10 may display a GUI for confirming the start of execution of the self-test on the first touch panel 17, and may start the self-test after YES button is operated (FIG. 9).

The management image forming apparatus 10 remotely accesses the remote access target apparatus 20C (Step S301), and transmits the apparatus log data of the remote access target apparatus 20C from the remote access target apparatus 20C to the edge server 40 (Step S302). On the other hand, the site server 30 stores server logs received from the respective image forming apparatus apparatuses 20 (Step S303) and supplies the server logs to the edge server 40 (Step S304). The edge server 40 automatically transmits the apparatus log data and the server log data to the cloud server 50 (i.e., without manual manipulation by a serviceman or the like) (Step S305).

For example, the apparatus log data of the remote access target apparatus 20C includes a log of a character string for natural language process, numerical sensing data, and the like. The logs of the character string notation for natural language processing include, for example, an embedded terminal log, a firmware log, and an application log. The numerical sensing information includes, for example, sensing information regarding vibration, temperature, illuminance, acceleration, atmospheric pressure, ultrasonic waves, geomagnetic, humidity, open-and-close, and switches.

The cloud server 50 manages, analyzes, and AI-learns the apparatus log data and the server log data, creates an AI model used by the edge server 40 for analysis, and transmits the AI model to the edge server 40 (Step S306). The edge server 40 analyzes the apparatus log data and the server log data in real time using the AI model learned by the cloud server 50, processes the data, and classifies error codes. For example, the edge server 40 performs ensemble type error code classification using the log information.

The edge server 40 transmits the analysis result to the remote access target apparatus 20C (Step S307). The management image forming apparatus 10 displays an analysis result screen 400 indicating the analysis result transmitted to the remote access target apparatus 20C being remotely accessed on the first touch panel 17 (Step S308).

Figure 10:
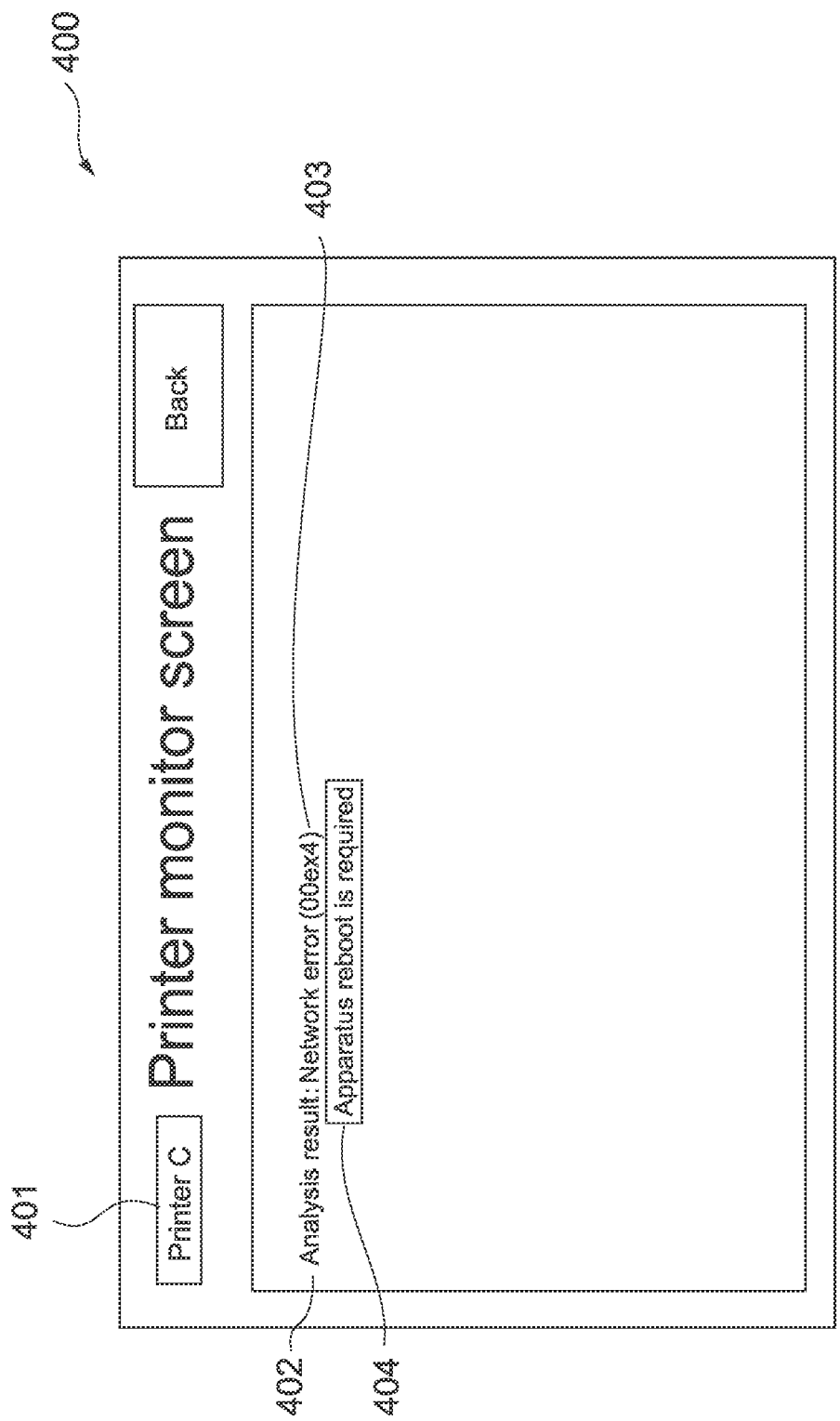
FIG. 10 shows an example of an analysis result screen.

FIG. 10 shows an example of an analysis result screen.

The analysis result screen 400 displays a name 401 (printer C) of the remote access target apparatus 20C, an analysis result 402 (network error), an error code 403, and a message 404 to the manager (apparatus reboot is required).

The manager refers to the message 404 (apparatus reboot is required) on the analysis result screen 400 displayed on the first touch panel 17 of the management image forming apparatus 10, and remotely operates and reboots the remote access target apparatus 20C in the remote access. The management image forming apparatus 10 determines the status after the reboot of the remote access target apparatus 20C that is being remotely accessed, and displays the status 302 after the reboot on the management menu screen 300. If the status 302 after the reboot is not "error occurring", the manager determines that the error of the remote access target apparatus 20C has disappeared, and ends the process. On the other hand, if the status 302 after the reboot is "error occurring", the manager may operate the inspection request button 309 as the next means.

(3) Request for Inspection

Figure 11:
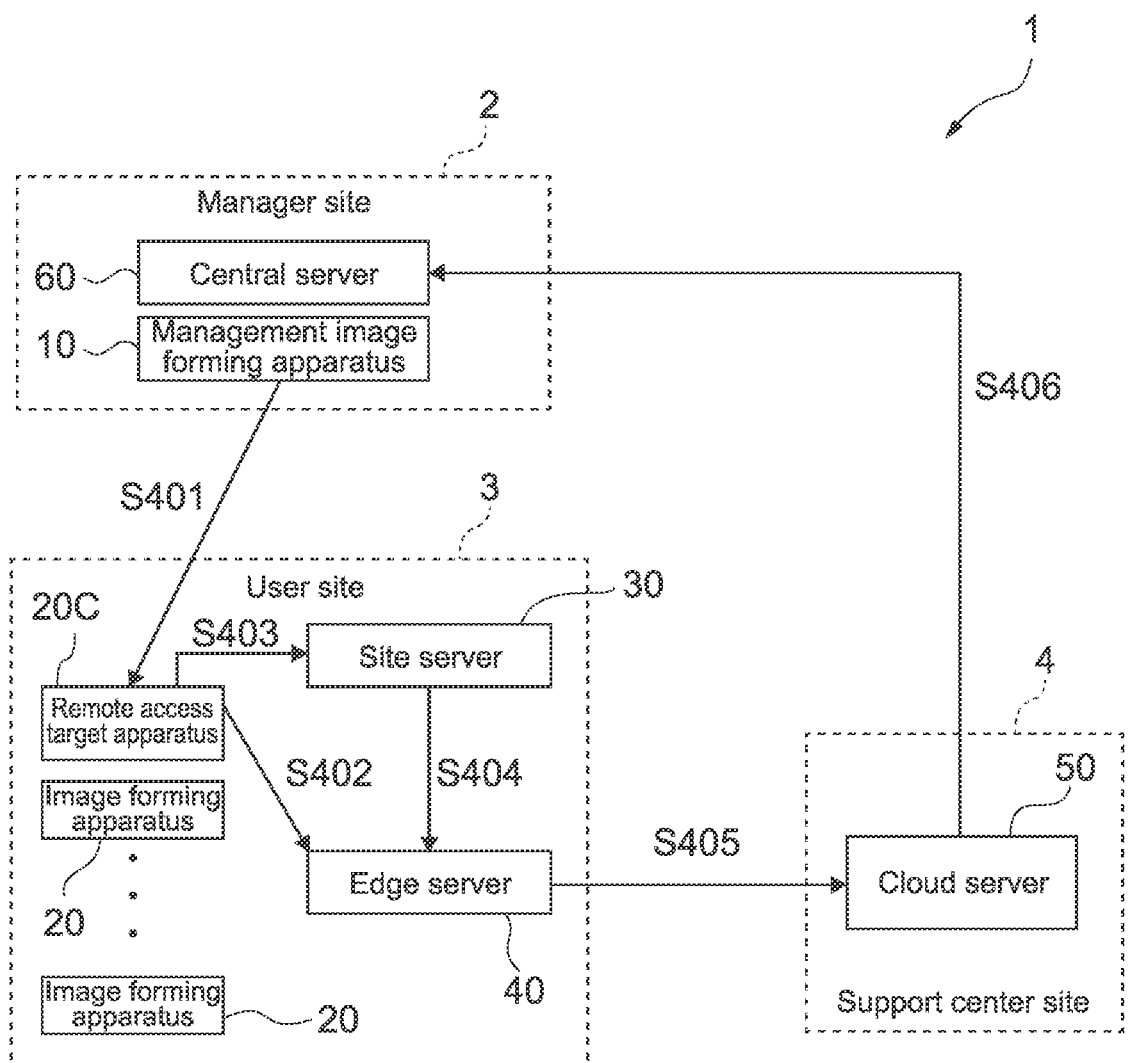
FIG. 11 shows an operation sequence of an inspection request.
Figure 12:
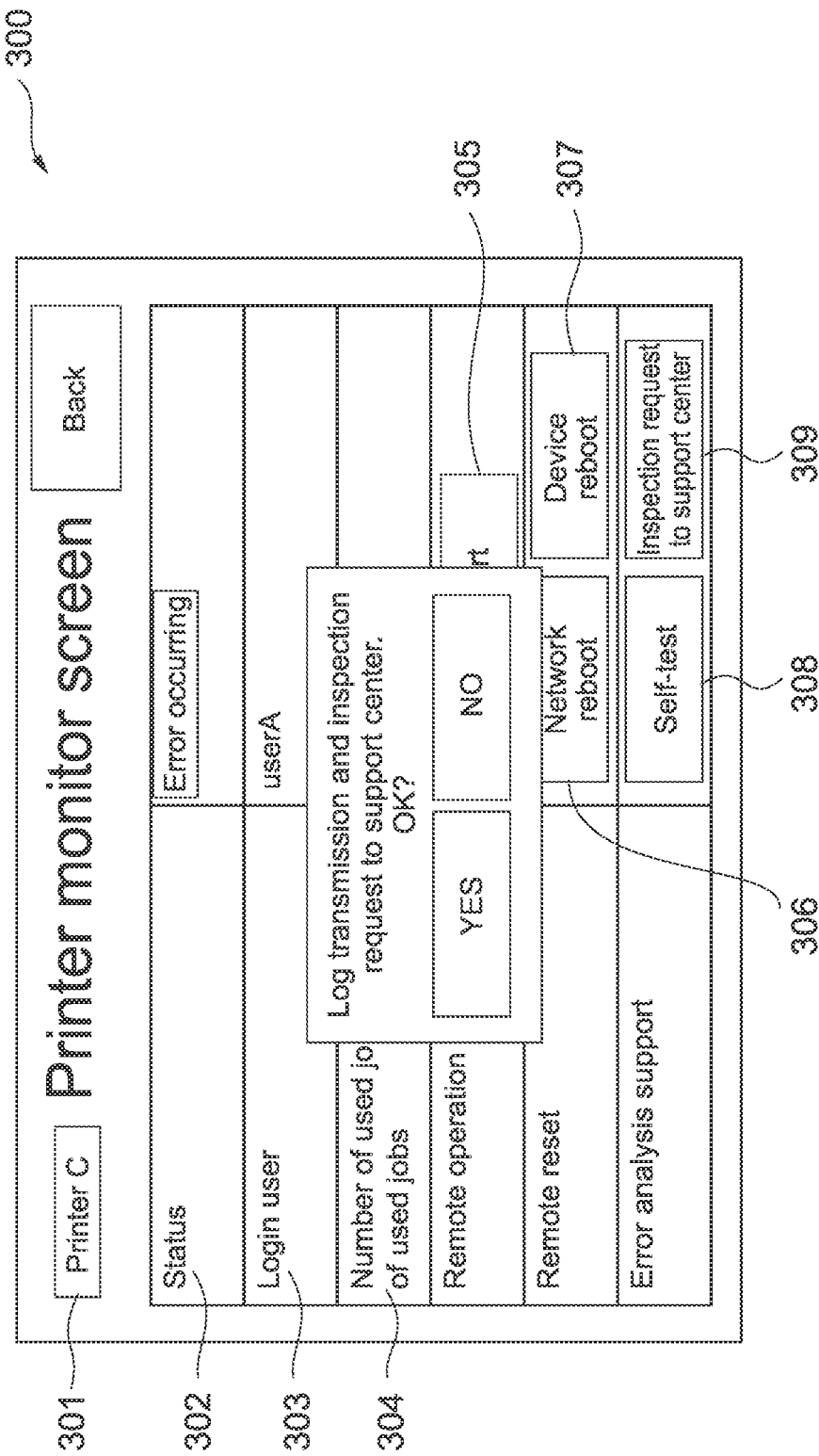
FIG. 12 shows a GUI for determining the initiation of an inspection request.
Figure 13:
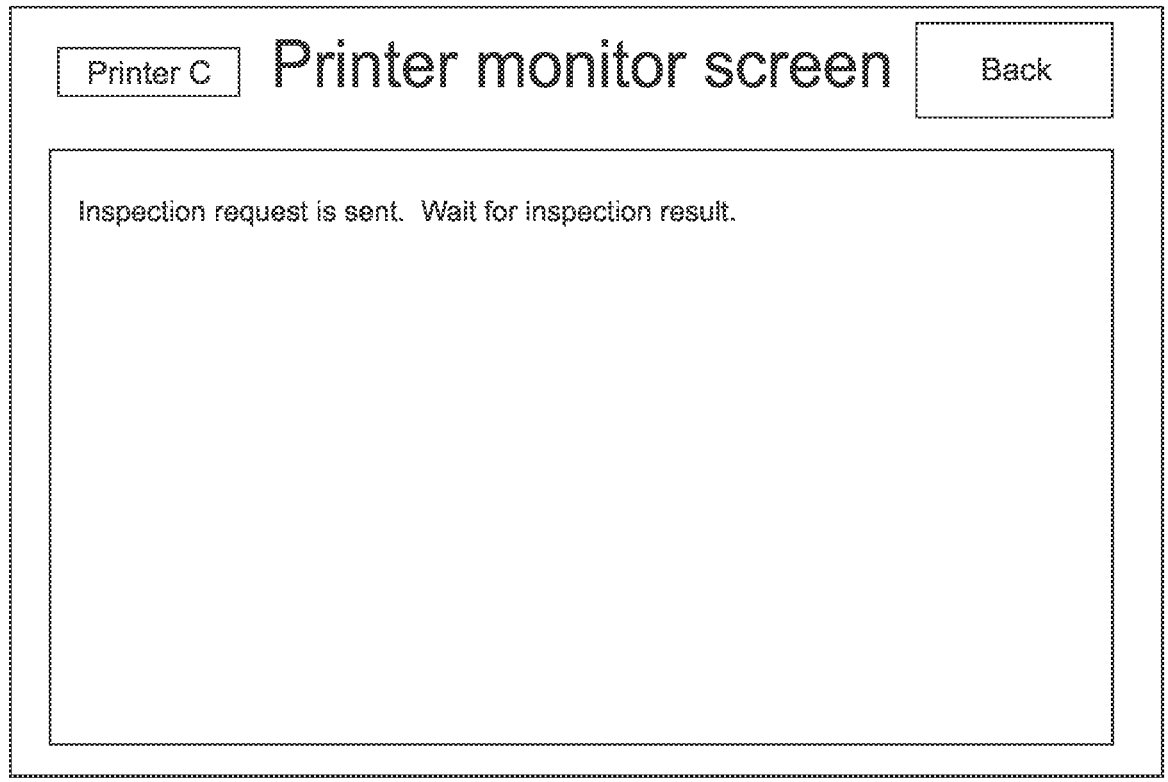
FIG. 13 shows an example of an inspection request execution screen.

FIG. 11 shows an operation sequence of an inspection request. FIG. 12 shows a GUI for determining the initiation of an inspection request. FIG. 13 shows an example of an inspection request execution screen.

When a manager operates the inspection request button 309 on the management menu screen 300, the management image forming apparatus 10 executes an inspection request for the remote access target apparatus 20C (Step S3c). Specifically, the management image forming apparatus 10 transmits an inspection request to the central server 60, and displays an inspection request execution screen (FIG. 13) on the first touch panel 17. After the inspection request button 309 is operated, the management image forming apparatus 10 may display a GUI for confirming the start of execution of the inspection request on the first touch panel 17, and may execute the inspection request after YES button is operated (FIG. 12).

The management image forming apparatus 10 remotely accesses the remote access target apparatus 20C (Step S401), and transmits the apparatus log data of the remote access target apparatus 20C from the remote access target apparatus 20C to the edge server 40 (Step S402). On the other hand, the site server 30 stores server logs received from the respective image forming apparatuses 20 (Step S403) and supplies the server logs to the edge server 40 (Step S404). The edge server 40 automatically transmits the apparatus log data and the server log data to the cloud server 50 (i.e., without manual manipulation by a serviceman or the like) (Step S405).

The serviceman of the support center site 4 inspects the remote access target apparatus 20C based on the apparatus log data and the server log data automatically transmitted to the cloud server 50, and enters the inspection data into the cloud server 50. The cloud server 50 transmits the inspection data based on the apparatus log data and the server log data to the central server 60 accessible by the manager (Step S406).

4. Conclusion

There is a server centralized system consisting of a master server and a site server, and a manager can manage licenses, other user rights, and log information of each site server on the master server. However, there is not proposed a method of managing information of an image forming apparatus activated by another site server from a panel of the image forming apparatus, a function of remotely operating the image forming apparatus, or a method of correcting a problem occurring in the image forming apparatus. At present, remote operation to the image forming apparatus is achieved by sending a dedicated application or a URL request specifying an IP from a browser. However, a PC is required for the operation, and it is not possible to support differences in operability and interfaces that are critical in the inspection when an error occurs. For example, when a problem occurs in which an input by an apparatus cannot be accepted due to a failure of an operation unit board, the problem can be easily identified by comparing the malfunction apparatus with the remotely operated apparatus. However, in the remote operation by a PC, an input by a keyboard or a mouse is assumed as prerequisites, and the prerequisites cannot be matched. On the other hand, there is a problem that the display on the panel is not correctly transitioned due to access by a specific browser. This may lead to an increase in the number of labor hours until the problem is solved.

Therefore, according to the present embodiment, by adding a management screen such as the management target selection screen 200 and the management menu screen 300 when the user logs in to the management image forming apparatus 10 with the account to which the manager authority is granted, the situation of each site server 30 is visualized, and an efficient solution at the time of occurrence of an error is realized. In addition, by implementing a self-test function using an AI and a data-management system using an IoT as one of the management functions, it is possible to provide a reduction in the number of labor hours required for requesting an inspection from a conventional service person.

According to the present embodiment, the manager can perform the unified management of the plurality of image forming apparatuses 20 in one management image forming apparatus 10. In addition, even when there is no personal computer at hand when an error occurs in a remote site, the situation can be confirmed by remote operation by the management image forming apparatus 10. In addition, unlike the keyboard and the mouse operation of the personal computer, when an operation on the image forming apparatus 20 such as the touch panel 27 (operation unit board) of the image forming apparatus 20 is required, the difference in the input interface can be supported and the confirmation can be performed. Further, by providing a check by remote operation (Step S3a), a self-test by an AI (Step S3b), and an inspection by a remote log-sending function to a serviceman (Step S3c), it is possible to shorten the process up to the error resolution of the image forming apparatus 20.

It should be understood by those skilled in the art that various modifications, combinations, sub-combinations and alterations may occur depending on design requirements and other factors insofar as they are within the scope of the appended claims or the equivalents thereof.

What is claimed is:

1. A remote management system, comprising:
    a management image forming apparatus including
        a first touch panel,
        a communication device configured to remotely access a plurality of image forming apparatuses each including a second touch panel, and
        a controller circuitry configured to
            when a login from a manager is accepted, display, on the first touch panel, a management target selection screen for selecting a remote access target apparatus to be a remote access target, from the plurality of image forming apparatuses,
            when the remote access target apparatus is selected, display, on the first touch panel, a management menu screen including a remote operation start button for executing a remote operation of the first touch panel of the remote access target apparatus, and
            when the remote operation start button is operated, superimpose a screen, which is displayed on the second touch panel of the remote access target apparatus, on the management menu screen displayed on the first touch panel to thereby display the screen in a remotely operable manner using the first touch panel,
    an edge server, and
    a site server configured to activate the plurality of image forming apparatuses, store server log data received from the plurality of image forming apparatuses, and supply the server log data to the edge server, wherein
    the management menu screen further includes a self-test execution button for executing a self-test of the remote access target apparatus,
    the controller circuitry of the management image forming apparatus is configured to, when the self-test execution button is operated, remotely access the remote access target apparatus, and transmit apparatus log data of the remote access target apparatus from the remote access target apparatus to the edge server,
    the edge server is configured to analyze the apparatus log data and the server log data, and transmit an analysis result to the remote access target apparatus, and
    the controller circuitry of the management image forming apparatus is configured to display, on the first touch panel, the analysis result transmitted to the remote access target apparatus being remotely accessed.

2. The remote management system according to claim 1, further comprising:
    a cloud server, wherein
    the edge server is configured to transmit the apparatus log data and the server log data to the cloud server,
    the cloud server is configured to learn the apparatus log data and the server log data, create a model used by the edge server for the analysis, and transmit the model to the edge server, and the edge server is configured to analyze the apparatus log data and the server log data by using the model.

3. The remote management system according to claim 1, further comprising:
a cloud server, wherein
the management menu screen further includes an inspection request button for requesting a support center to inspect the remote access target apparatus,
the controller circuitry of the management image forming apparatus is configured to, when the inspection request button is operated, remotely access the remote access target apparatus, and transmit apparatus log data of the remote access target apparatus from the remote access target apparatus to the edge server,
the edge server is configured to transmit the apparatus log data and the server log data to the cloud server, and
the cloud server is configured to transmit an inspection result based on the apparatus log data and the server log data to a central server accessible by the manager.

4. A management image forming apparatus, comprising:
a first touch panel;
a communication device configured to remotely access a plurality of image forming apparatuses each including a second touch panel; and
a controller circuitry configured to
when a login from a manager is accepted, display, on the first touch panel, a management target selection screen for selecting a remote access target apparatus to be a remote access target, from the plurality of image forming apparatuses,
when the remote access target apparatus is selected, display, on the first touch panel, a management menu screen including a remote operation start button for executing a remote operation of the first touch panel of the remote access target apparatus, and
when the remote operation start button is operated, superimpose a screen, which is displayed on the second touch panel of the remote access target apparatus, on the management menu screen displayed on the first touch panel to thereby display the screen in a remotely operable manner using the first touch panel,
an edge server; and
a site server configured to activate the plurality of image forming apparatuses, store server log data received from the plurality of image forming apparatuses, and supply the server log data to the edge server, wherein
the management menu screen further includes a self-test execution button for executing a self-test of the remote access target apparatus,
the controller circuitry of the management image forming apparatus is configured to, when the self-test execution button is operated, remotely access the remote access target apparatus, and transmit apparatus log data of the remote access target apparatus from the remote access target apparatus to the edge server,
the edge server is configured to analyze the apparatus log data and the server log data, and transmit an analysis result to the remote access target apparatus, and
the controller circuitry of the management image forming apparatus is configured to display, on the first touch panel, the analysis result transmitted to the remote access target apparatus being remotely accessed.

* * * * *